(12) United States Patent
Schier

(10) Patent No.: US 6,370,237 B1
(45) Date of Patent: Apr. 9, 2002

(54) VOICE ACTIVATED DIALING WITH REDUCED STORAGE REQUIREMENTS

(75) Inventor: John Schier, Austin, TX (US)

(73) Assignee: Alcatel USA Sourcing, LP, Plano, TX (US)

(*) Notice: Subject to any disclaimer, the term of this patent is extended or adjusted under 35 U.S.C. 154(b) by 0 days.

(21) Appl. No.: 09/222,746

(22) Filed: Dec. 29, 1998

(51) Int. Cl.[7] .................................................. H04M 1/64
(52) U.S. Cl. ........................ 379/88.03; 379/216.01; 379/355.04; 704/243; 704/275
(58) Field of Search .......................... 379/88.01, 88.02, 379/88.03, 216, 352, 353, 904, 216.01, 355.01, 355.04; 455/564; 704/231, 246, 251, 270, 272, 275, 243

(56) References Cited

U.S. PATENT DOCUMENTS

| | | | |
|---|---|---|---|
| 4,348,550 A | * 9/1982 | Pirz et al. | 379/357 |
| 4,928,302 A | * 5/1990 | Kaneuchi et al. | 379/88.03 |
| 5,165,095 A | * 11/1992 | Borcherding | 379/88.03 |
| 5,369,685 A | * 11/1994 | Kero | 379/88.04 |
| 5,452,340 A | * 9/1995 | Englebeck et al. | 379/88.03 |
| 5,566,229 A | * 10/1996 | Hou et al. | 379/88.02 |
| 5,717,738 A | * 2/1998 | Gammel | 379/88.03 |
| 5,719,921 A | * 2/1998 | Vysotsky et al. | 379/88.01 |
| 5,893,059 A | * 4/1999 | Raman | 704/256 |
| 5,924,070 A | * 7/1999 | Ittycheriah et al. | 704/275 |
| 5,991,364 A | * 11/1999 | McAllister et al. | 379/88.01 |
| 6,088,428 A | * 7/2000 | Trandal et al. | 379/88.02 |

OTHER PUBLICATIONS

Cassel, P., Sams Teach Yourself Acess 97 in 14 Days, 4E, Dec. 29, 1996, Sams, Macmillan Computer Publishing, ISBN: 0672309696, Introduction: Putting it in Action.*

* cited by examiner

*Primary Examiner*—Fan Tsang
*Assistant Examiner*—Roland G. Foster
(74) *Attorney, Agent, or Firm*—Anderson, Levine & Lintel, llP

(57) ABSTRACT

A voice activated dialing system includes a database maintaining a plurality of speech templates, associated telephone numbers, and recordings, wherein multiple speech templates can be linked to a single master recording. Processing circuitry compares an utterance from a user to one or more of the templates from the database to find a matching template. When a match is found, the processing circuitry retrieves the telephone number associated with the matching template and the corresponding recording. The recording is replayed to the user prior to initiating a connection to the associated telephone number. Master recordings can be used for multiple entries which are associated with a single telephone number to reduce storage requirements.

8 Claims, 3 Drawing Sheets

FIG. 1
(PRIOR ART)

| USER | TEMPLATE | NUMBER | RECORDING |
|---|---|---|---|
| User1 | <Template1> | 214-555-1111 | <"Store 101"-user1> |
| User1 | <Template2> | 214-555-1112 | <"Store 102"-user1> |
| User1 | <Template3> | 214-555-1113 | <"Store 103"-user1> |
| User1 | <Template4> | 214-555-1114 | <"Store 104"-user1> |
| User1 | <Template5> | 214-555-5555 | <"Home"-user1> |
| ... | | | |
| User2 | <Template1001> | 214-555-1111 | <"Store 101"-user2> |
| User2 | <Template1002> | 214-555-1112 | <"Store 102"-user2> |
| User2 | <Template1003> | 214-555-1113 | <"Store 103"-user2> |
| User2 | <Template1004> | 214-555-1114 | <"Store 104"-user2> |
| User2 | <Template1005> | 214-555-6666 | <"Home"-user2> |
| User2 | <Template1006> | 770-555-1212 | <"Mom"-user2> |
| ... | | | |
| User3 | <Template2001> | 214-555-1111 | <"Store 101"-user3> |
| User3 | <Template2002> | 214-555-1112 | <"Store 102"-user3> |
| User3 | <Template2003> | 214-555-1113 | <"Store 103"-user3> |
| User3 | <Template2004> | 214-555-1114 | <"Store 104"-user3> |

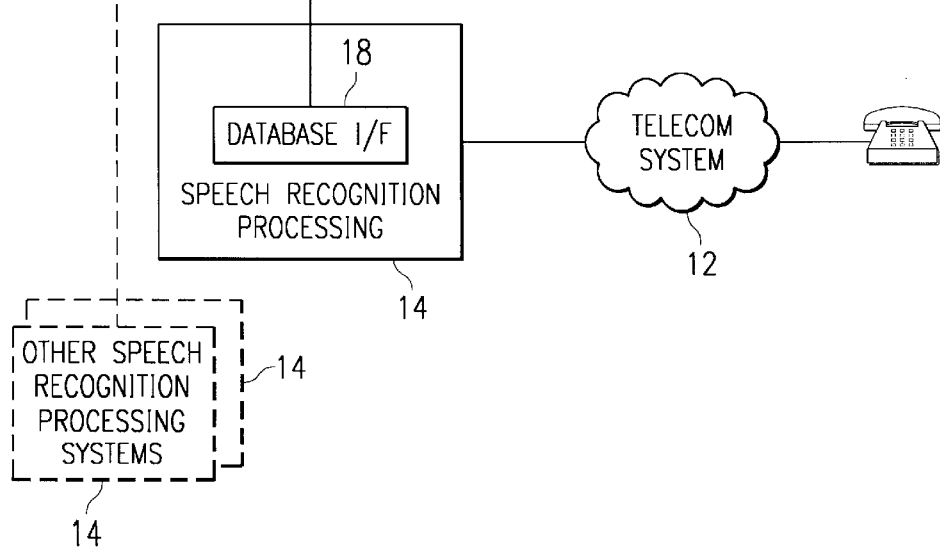

FIG. 2

| USER | TEMPLATE | NUMBER | | RECORDING |
|------|----------|--------|---|-----------|
| User1 | <Template1> | 214-555-1111 | | <"Store 101"-master> |
| User1 | <Template2> | 214-555-1112 | | <"Store 102"-master> |
| User1 | <Template3> | 214-555-1113 | | <"Store 103"-master> |
| User1 | <Template4> | 214-555-1114 | | <"Store 104"-master> |
| User1 | <Template5> | 214-555-5555 | | <"Home"-user1> |
| ... | | | | <"Home"-user2> |
| User2 | <Template1001> | 214-555-1111 | | <"Mom"-user2> |
| User2 | <Template1002> | 214-555-1112 | | |
| User2 | <Template1003> | 214-555-1113 | | |
| User2 | <Template1004> | 214-555-1114 | | |
| User2 | <Template1005> | 214-555-6666 | | |
| User2 | <Template1006> | 770-555-1212 | | |
| ... | | | | |
| User3 | <Template2001> | 214-555-1111 | | |
| User3 | <Template2002> | 214-555-1112 | | |
| User3 | <Template2003> | 214-555-1113 | | |
| User3 | <Template2004> | 214-555-1114 | | |

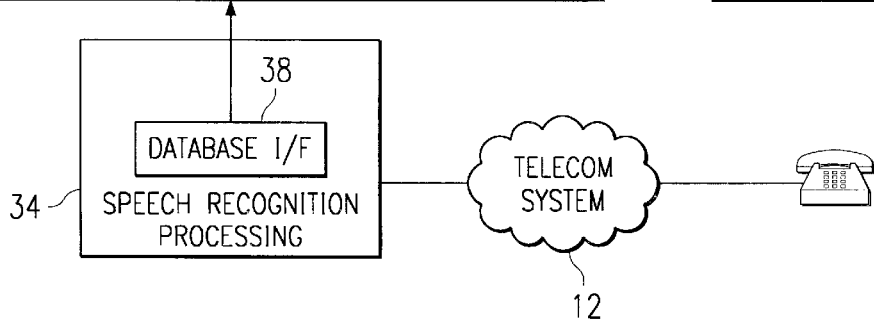

VOICE ACTIVATED DIALING WITH REDUCED STORAGE REQUIREMENTS

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to voice activated dialing.

2. Description of the Related Art

Voice activated dialing has become a popular feature in many telephone systems. With voice activated dialing, a user can call a destination number without the need to look up the number or press any keys.

Typically, a caller can initiate a connection through a simple command such as "call the boss" or "call home." In this example, "call" is a command recognized by the voice activated dialing system (typically through speaker independent voice recognition) and "the boss" or "home" are destinations enrolled by the user. During enrollment, the user speaks the phrase which will be used to designate a destination and provides a number, either through the telephone keypad or by speaking the numbers into the phone (which are recognized using speaker independent voice recognition). The phrase is digitally recorded by the voice activated dialing system and is also reduced to a template (typically using linear predictive coding) for speech recognition purposes.

After enrollment, if the user initiates a call, for example, "call the boss", the system will compare the utterance with all the voice dialing templates associated with that user to determine whether there is a match. If not, the system will ask the user to repeat the request. If a match is found, the system will respond with "calling the boss", where "the boss" is repeated in the users own voice using the recording stored along with the template during enrollment. This confirmation gives the user an opportunity to abandon the call if the voice activated system does not properly recognize the command.

While the confirmation is an important feature of the voice activated dialing system, since the matching process is not perfect and incorrect matches can occur, its cost in storage space and time is significant. While the template is fairly small, typically 1000 bytes or less, a compressed recording requires a significantly larger amount of storage in order to retain enough speech data to re-create an acceptable recording for playback. Consequently, the amount of storage required for large voice activated template directories is not very large, but it is very large for the corresponding recordings. Frequently, because of their size, the recordings are not stored on the system doing the recognition, but must be downloaded from another system. This introduces call setup delays which are annoying to users.

Naturally, this is a significant problem when large directories are used. The problem increases when longer utterances are recorded to accompany the templates. For a 1.5 second recording at 16,000 bits/sec, 24,000 bits or 3000 bytes are needed. For a higher quality recording at 64,000 bits/sec, 12000 bytes are necessary for the same recording.

While voice activated dialing should be encouraged to promote efficiency in the workplace, particularly when work includes calling a large number of numbers, the costs of storage can mean that workers must reduce their use of voice activated dialing. Typically, workers will eliminate the least used numbers from their voice activated dialing lists; it is these numbers that are the least likely to be memorized, requiring the workers to look up the numbers, which is inefficient.

Therefore a need has arisen for a voice activated dialing system for large dialing directories with reduced storage requirements.

BRIEF SUMMARY OF THE INVENTION

A voice activated dialing system includes a database maintaining a plurality of speech templates, associated telephone numbers, and recordings, wherein multiple speech templates can be linked to a single recording. Processing circuitry compares an utterance from a user to one or more of the templates from the database to find a matching template. When a match is found, the processing circuitry retrieves the telephone number associated with the matching template and the recording linked to the matching template. The recording is replayed to the user prior to initiating a connection to the associated telephone number.

The present invention provides significant advantages over the prior art. First, the storage requirements, and hence the cost, of the system can be greatly reduced because the number of recordings used in the system can be greatly reduced. Second, because the number of recordings is reduced, it is possible to store the recordings local to the processing circuitry, thereby increasing the responsiveness of the system.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1 illustrates a prior art structure for voice activated dialing;

FIG. 2 illustrates a structure for voice activated dialing to reduce storage requirements and increase speed.

DETAILED DESCRIPTION OF THE INVENTION

Figure 3:
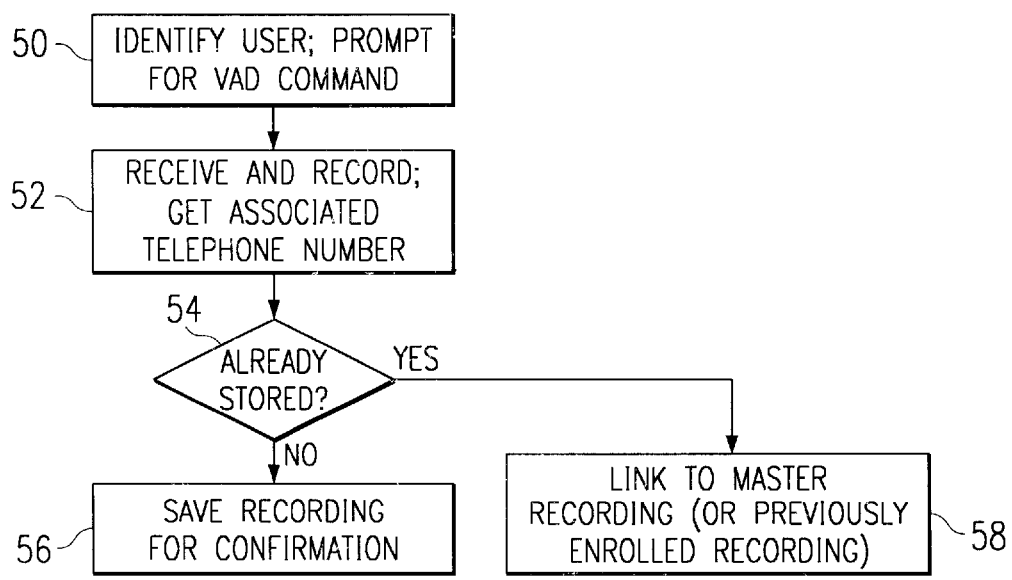
FIG. 3 illustrates a flow chart which could be used for enrollment using the voice activated dialing structure of FIG. 2.

The present invention is best understood in relation to FIGS. 1–3 of the drawings, like numerals being used for like elements of the various drawings.

FIG. 1 illustrates a depiction of a prior art voice activated dialing system 10. It should be noted that this structure has been greatly simplified to show the important features for illustration purposes. The voice activated dialing system 10 is coupled to a telecommunications system 12 (which may be a local telephone system, a long distance carrier, private branch exchange (PBX), computer network or other system). The voice activated dialing system 10 includes processing circuitry 14 and database circuitry 16 (which may be a central database shared between multiple processing circuits 14). Processing circuitry 14 includes database interface circuitry 18 to communicate with the database circuitry 16.

The database circuitry 16 may be a centralized database or a distributed database. In a centralized database system, multiple processors 14 access a common database with information for all users in the common database. In a distributed database system, each processor has an associated database which contains a portion of the information of the overall database; if information is needed for a user which is not stored locally, it must be downloaded from another distributed database, or from a centralized backup database.

In operation, the voice activated dialing system 10 receives commands from users for dialing instructions. The commands, given verbally by users, are received by the processing circuitry 14, where the utterance is conditioned (typically into linear predictive coding vectors) and compared to the user's templates in database circuitry 16. It is assumed that the speaker's identity (for purposes of downloading the correct templates from the database circuitry 16) is known to the processing circuitry 14 either by the identity of the phone extension, a user logon, or other means. The templates are then compared with the linear predictive coding vectors derived from the utterance, and the closest match is found. The database circuitry 16 stores a corresponding telephone number and recording for each template, which are retrieved from database 16 to initiate the connection.

As an illustrative example, assume that User2 initiates a voice activated dialing session by speaking "call store 102" into his phone. The processing circuitry 14 digitizes User2's speech and transforms it into LPC (linear predictive coding) vectors. These vectors are compared with all the templates for User2 in the database 16. If a match is found, the recording associated with the matching template is downloaded along with the telephone number associated with the matching template. In this example, the matching template should be <template 1002>. Thus, recording <"Store 102"-user2>should be downloaded along with the number "214-555-1112". The processing circuitry will announce "calling" and replay the recording <"Store 102"-user2>, which is the recording made from User2's voice at the time that User2 enrolled "Store 102" into the voice activated dialing system 10. Unless User2 aborts the call, the processing circuitry 14 will provide the dialing information to the telecommunications system 12 to initiate the connection to Store 102.

As shown in FIG. 1, the one-to-one correspondence between templates and recordings causes the system 10 to have significant increases in storage requirements each time a new voice activated dialing entry is added, since each new entry adds a new digital recording. Further, there is a significant delay in initiating the connection if the recording has to be downloaded from another system.

FIG. 2 illustrates a voice activated dialing system 30 which can dramatically decrease the amount of storage for voice activated dialing and which also increases the responsiveness of the system. As in FIG. 1, the voice activated dialing system 30 is coupled to a telecommunications system 12 (which may be a local telephone system, a long distance carrier, private branch exchange (PBX), computer network or other system). The voice activated dialing system 30 includes processing circuitry 34 and database circuitry 36 (which may be shared between multiple VAD systems). Processing circuitry 34 includes database interface circuitry 38 to communicate with the database circuitry 36.

The voice activated dialing system 30 uses a many-to-one relationship between the templates and the recordings. Accordingly, when multiple users each have voice activated dialing entries for the same telephone number, the templates for each user remain unique (as is necessary for proper speaker dependent speech recognition), but a single master recording for the telephone number is replayed during the confirmation stage. Accordingly, the number of digital recordings stored in the voice activated dialing system 30 is determined by the number of unique telephone numbers, rather than by the number of enrolled voice activated dialing entries.

Using the example set forth above, User2 once again initiates a voice activated dialing session by speaking "call store 102" into his phone. The processing circuitry 34 digitizes User2's speech and transforms it into LPC (linear predictive coding) vectors. These vectors are compared with all the templates for User2 in the database 36. If a match is found, the recording associated with the matching template is retrieved along with the telephone number associated with the matching template. In this example, the matching template should be <template 1002>, as in the example above. In this case, however, the recording <"Store 102"-master>is retrieved along with the number "214-555-1112". In many cases, the recordings for the overall database can be stored locally, due to the smaller storage requirements for the recordings. The processing circuitry will announce "calling" and replay the recording <"Store 102"-master>. Unless User2 aborts the call, the processing circuitry 34 will provide the dialing information to the telecommunications system 32 to initiate the connection to Store 102. In cases where the recordings, or at least the master recordings, are local to the processor 34, the confirming recording can be played almost immediately after the recognition.

If User 1 initiates a voice activated dialing session by speaking "call store 102" into her phone, the voice activated dialing system 30 digitizes User1's speech and transforms the utterance into LPC vectors to compare to User1's templates. After matching the utterance with template <Template2>, the system will once again retrieve the <"Store 102"-master>recording along with the telephone number "214-555-1212".

On the other hand, if User2 initiated a voice activated dialing session by stating "call home", the confirmation process would retrieve a unique recording <"home-user2">for repeating to User2 prior to making the connection. If User1 initiated a voice activated dialing session by stating "call home", the confirmation process would retrieve a unique recording <"home-user1">. This is because the telephone numbers associated with the two voice activated dialing entries are different, even though the verbal command to initiate the voice activated dialing sessions is the same.

Accordingly, the voice activated dialing system 30 described above can greatly reduce storage requirements in certain situations where multiple callers each have entries for the same destination number. A situation like this would occur, for example, in a chain of stores where calls are frequently placed between the stores. It would also be useful in an office environment where each employee has voice activated dialing entries for a large number of the other employees, such that extension numbers do not need to be memorized.

Further, if the entire database can be stored locally, or if the recordings can be stored locally, the responsiveness of the system can be greatly enhanced. In some systems where there is not enough local storage to store all recordings locally, the master recordings may be stored locally for faster response in connection with the most frequently used recordings.

It should be noted that the master recordings are associated with the telephone numbers, not the command represented by the template. For example, User1 could refer to "Store 102" as "the Oklahoma store" in her voice activated dialing. To initiate a voice activated dialing to call "Store 102", User1 would say "call the Oklahoma store" and the voice activated dialing system 10, after correctly matching the utterance to template <Template2>, would respond with "Calling Store 102", where "Store 102" was recorded in <"Store 102-master">. Thus, the command used by an individual can vary from the recording used in the confirmation process.

The making of a master recording, i.e., a recording associated with two or more voice activated dialing entries, can be done in a number of ways. One way would be to notify the system administrator when redundant entries (multiple entries to the same telephone number) were found in the database 36. The system administrator could then make a master recording to which each of the redundant entries would be linked through the database 36.

A second method of enrolling new entries is shown in FIG. 3. In block 50, processing circuitry 34 identifies the user and prompts the user for a new voice activated dialing entry. In block 52, the entry spoken by the user is received and recorded and the telephone number associated with the entry is entered by the user, either by voice commands or the touch tone keypad. In decision block 54, the processing circuitry 34 searches the database 36 for other references to the telephone number entered by the user. If no redundant entries are detected, the recording is saved in the database 36 and linked to the entry in block 56. On the other hand, if the processing circuitry 34 detects on or more references to the telephone number entered by the user, it links the entry to the previously enrolled entry in block 60. At a later time, the recording could then be changed, if desired, by authorized personnel.

The storage savings can be significant. In a system where 1000 users frequently call the same 2000 destinations, there would be up to 2000 templates for each of 1000 users, plus up to 2000 recordings for each of 1000 users. The template size, assuming use of a 1000 byte template, would be 1000 users×2000 templates/user×1000 bytes/template, or 2 gigabytes of template information. Even with speech compression, the size of the confirming recordings would be approximately 1000 users×2000 recordings/user×16,000 bit/sec×1.5 sec/recording×1 byte/ 8 bits, or 6 gigabytes. If the recording was performed at 64k bits per second, the require recording storage would be 24 gigabytes. By reducing the 2 million recordings to 2000 recordings by using shared master recordings, the storage requirements could be reduced by a factor of 1000 to 6 megabytes (24 megabytes for 64 kbit/ sec recordings). This relatively small amount of storage can easily be accommodated locally. The templates, which are significantly smaller, can be stored locally if possible or centrally if necessary.

The present invention provides several advantages over the prior art. First, in many situations, the number of recordings stored on the system can be greatly reduced, thus reducing storage requirement and, consequently, the cost of the voice activated dialing. Second, since the recording storage is greatly reduced, the recordings can be maintained locally, increasing the speed of retrieval and the responsiveness of the system.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A voice activated dialing system, comprising:
    a database including a plurality of speech templates, associated telephone numbers, and recordings, wherein multiple speech templates by multiple users can be linked to a single recording; and
    processing circuitry for:
        enrolling a new telephone number by generating a new speech template for the new telephone number, comparing said new telephone number with existing telephone numbers in said database to identify existing associations between existing templates and said new telephone number, associating said new speech template to a single recording associated with other of said existing templates that are also associated with said new telephone number;
        comparing an utterance to one or more of said templates from said database to determine a matching template;
        retrieving the telephone number associated with the matching template;
        retrieving the recording linked to the matching template; and
        replaying said recording to the user prior to initiating a connection to said associated telephone number.

2. The voice activated dialing system of claim 1 wherein said recordings are stored local to the processing circuitry.

3. The voice activated dialing system of claim 1 wherein said templates are stored local to the processing circuitry.

4. The voice activated dialing system of claim 1 wherein said templates are stored in a centralized database.

5. A method of performing voice activated dialing, comprising the steps of:
    storing a plurality of speech templates, associated telephone numbers, and associated recordings, wherein multiple speech templates by multiple users can be linked to a single recording;
    enrolling a new telephone number by generating a new speech template for the new telephone number, comparing said new telephone number with existing telephone numbers in said database to identify existing associations between existing templates and said new telephone number, associating said new speech template to a single recording associated with other of said existing templates that are also associated with said new telephone number;
    comparing an utterance to one or more of said templates from said database in a processor using speech recognition techniques to determine a matching template;
    retrieving the telephone number associated with the matching template;
    retrieving the recording linked to the matching template; and
    replaying said recording to the user prior to initiating a connection to said associated telephone number.

6. The method of claim 5 wherein said storing step includes the step of storing recordings local to the processing circuitry.

7. The method of claim 5 wherein said storing step includes the step of storing templates local to the processing circuitry.

8. The method of claim 5 wherein said storing step includes the step of storing templates in a centralized database.

* * * * *